No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 1.
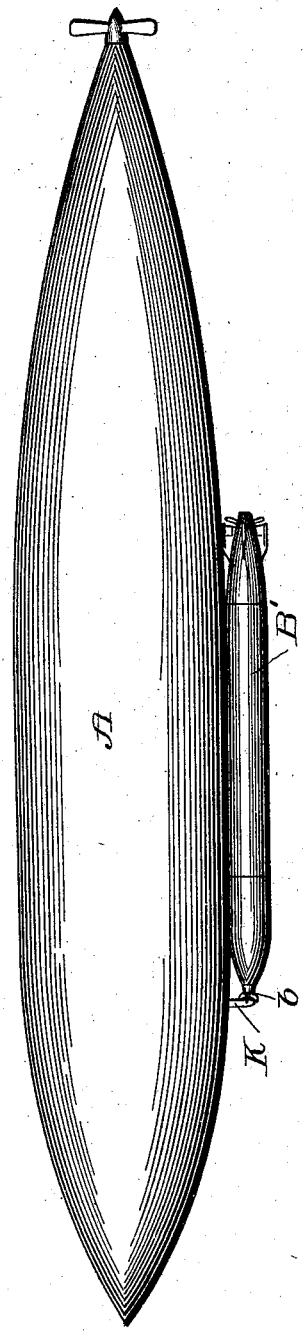
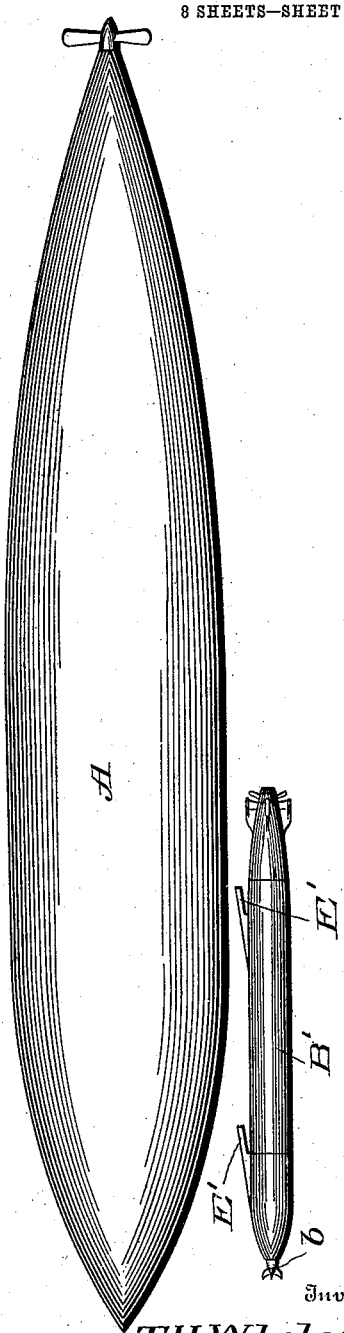
Witnesses
Geo. H. Pipue.
L. Bunz.
Inventor
T. H. Wheless.
By Wilkinson & Fisher,
Attorneys.

No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 2.
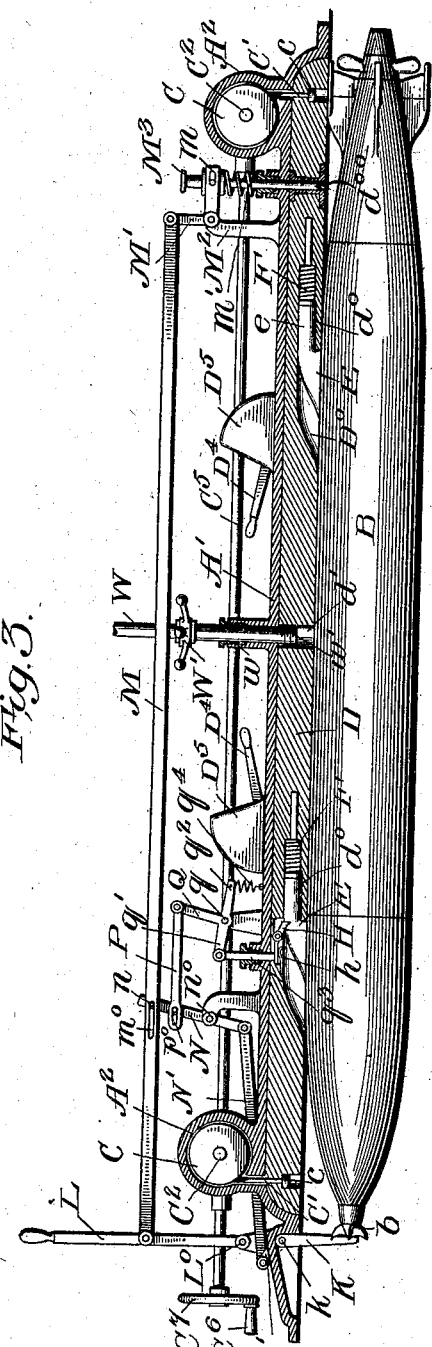
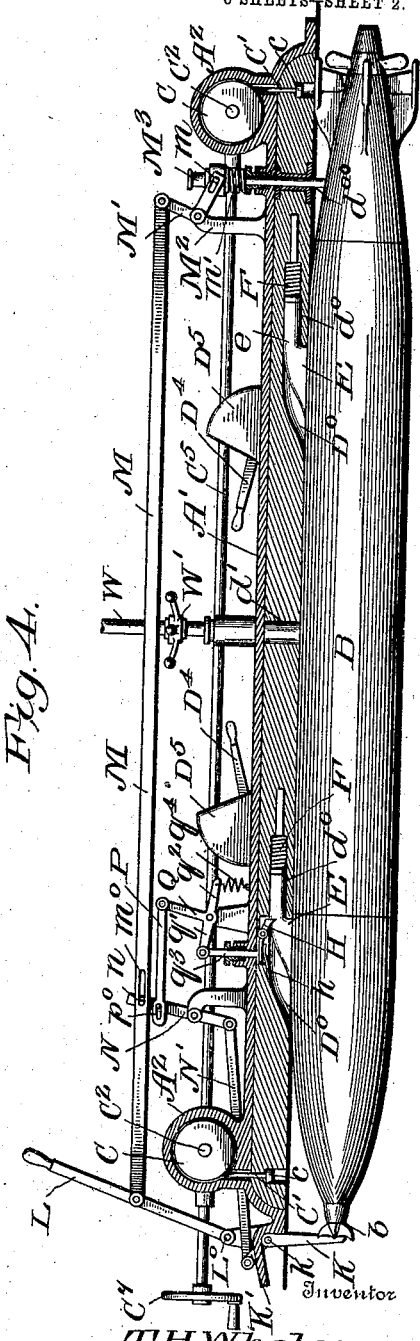
Witnesses
Geo. H. Byrne
L. Bunz
Inventor
T. H. Wheless.
By Wilkinson & Fisher,
Attorneys No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 3.
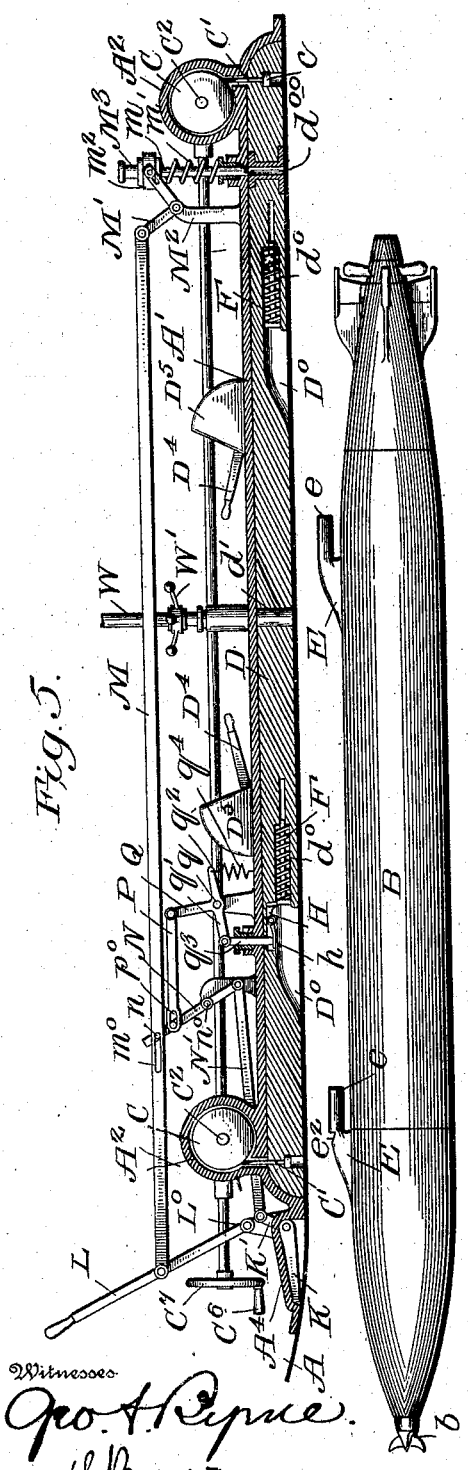
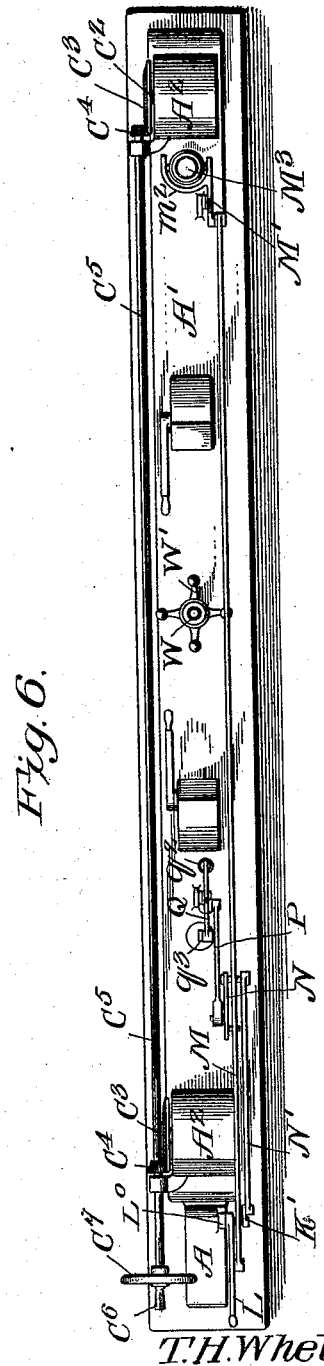

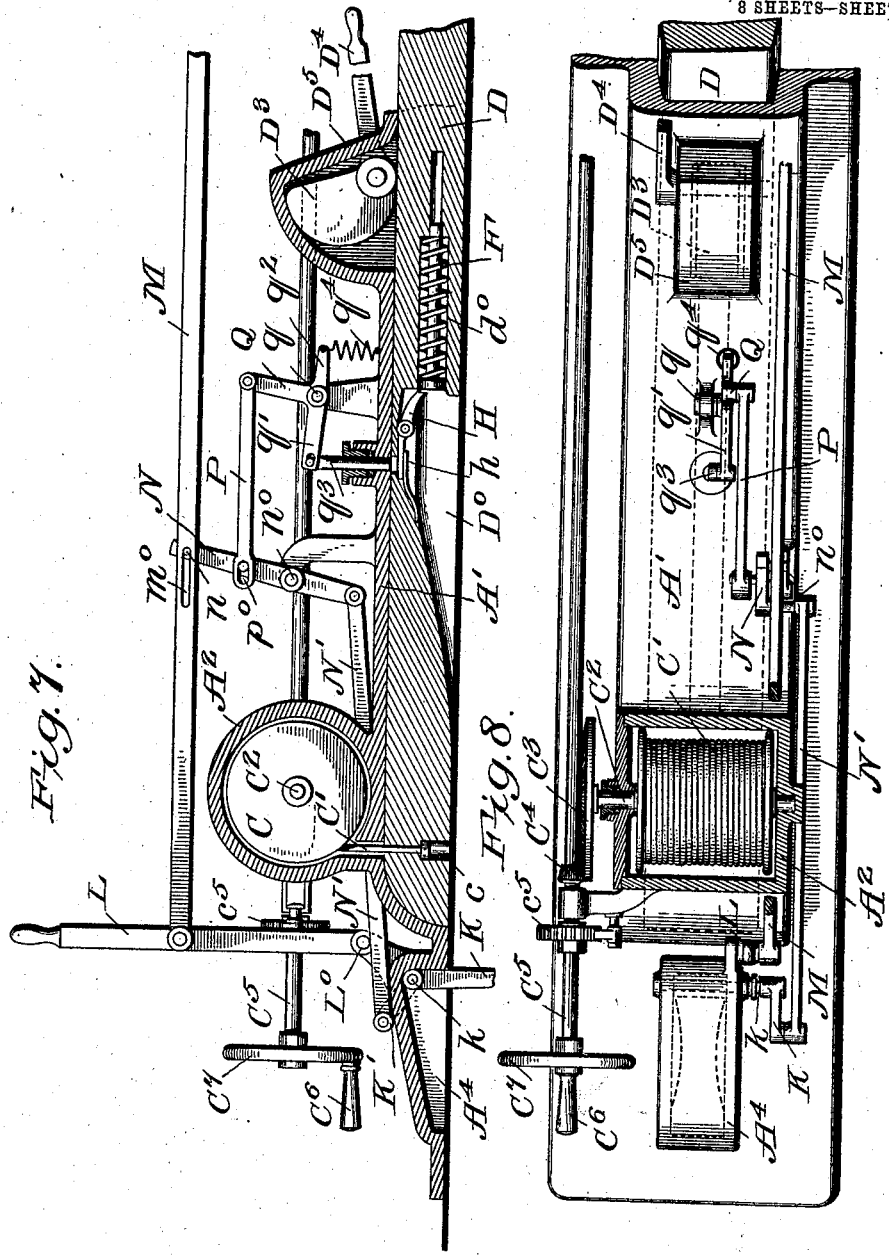

No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 5.
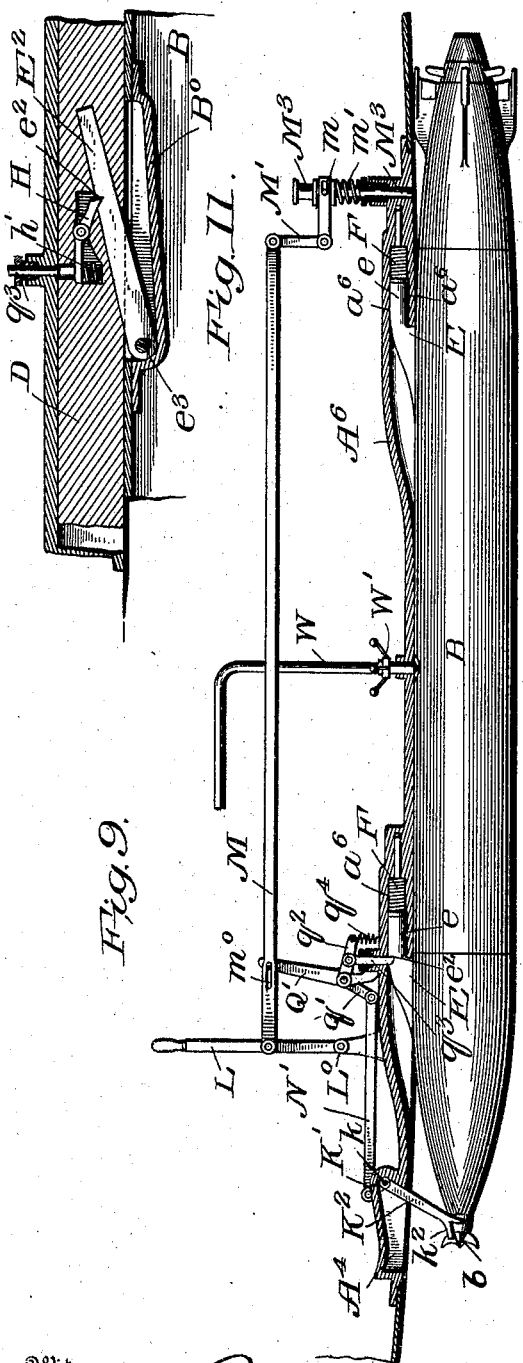
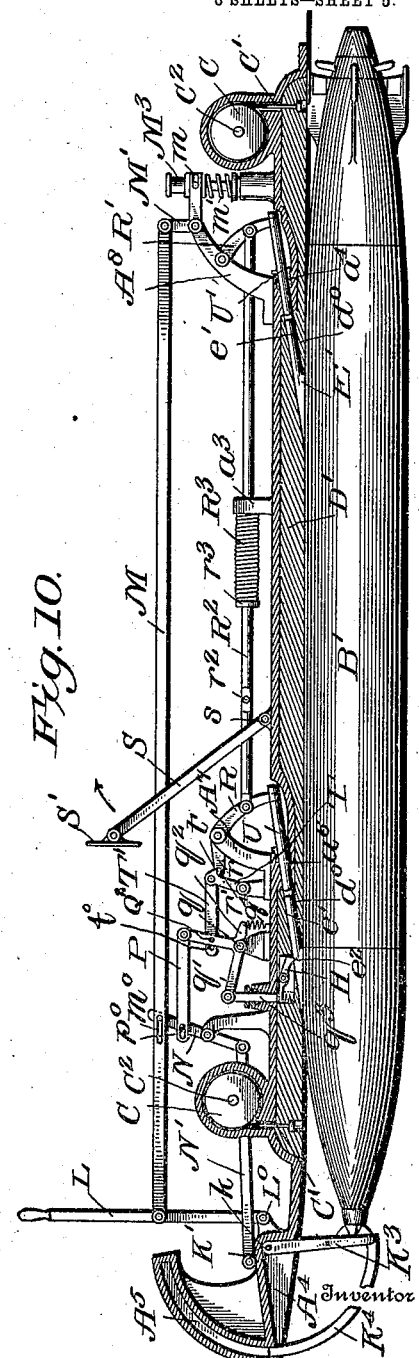

No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 6.
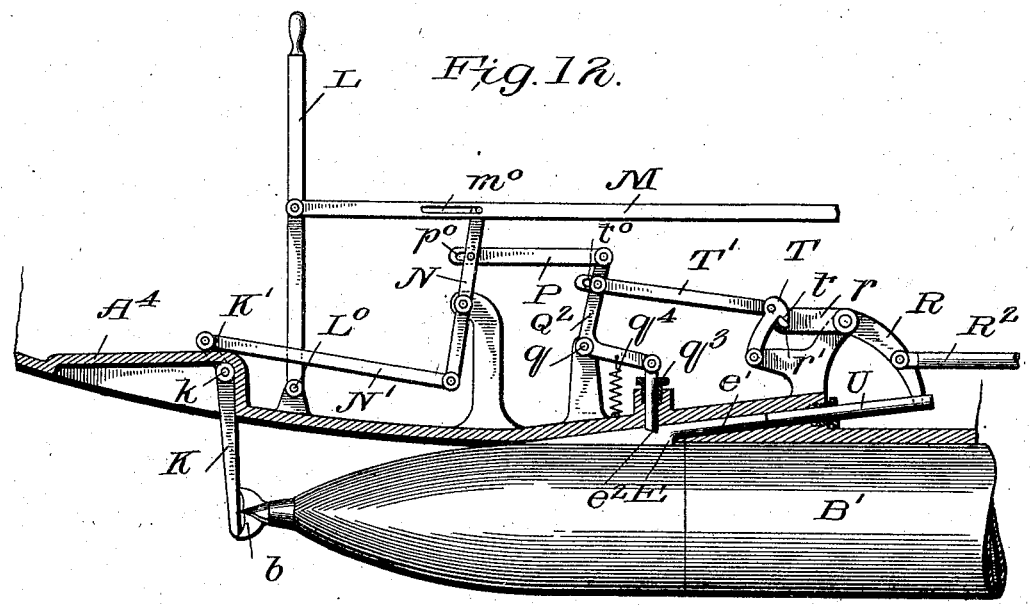
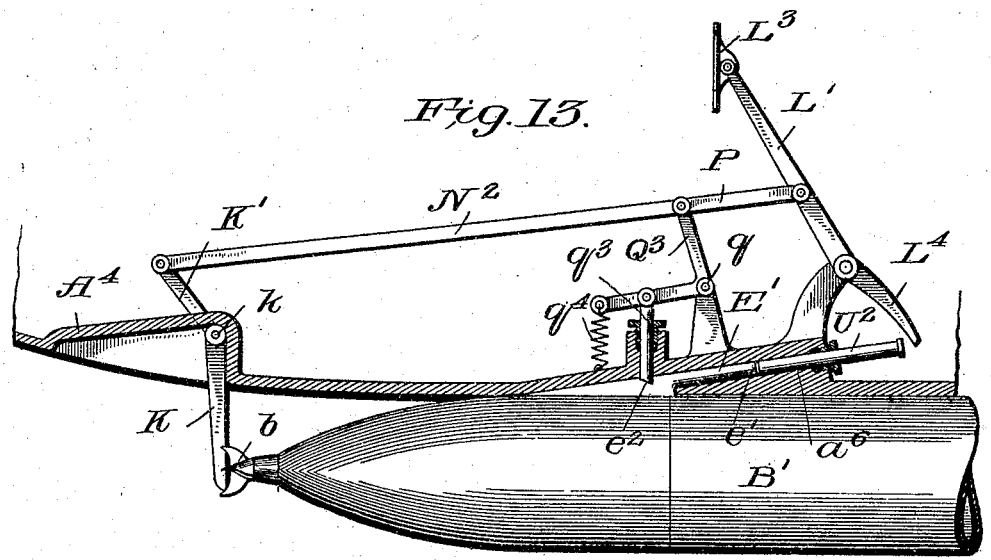
Witnesses
Geo H Dupree
L Bunz
Inventor
T. H. Wheless.
By Wilkinson & Fisher,
Attorneys

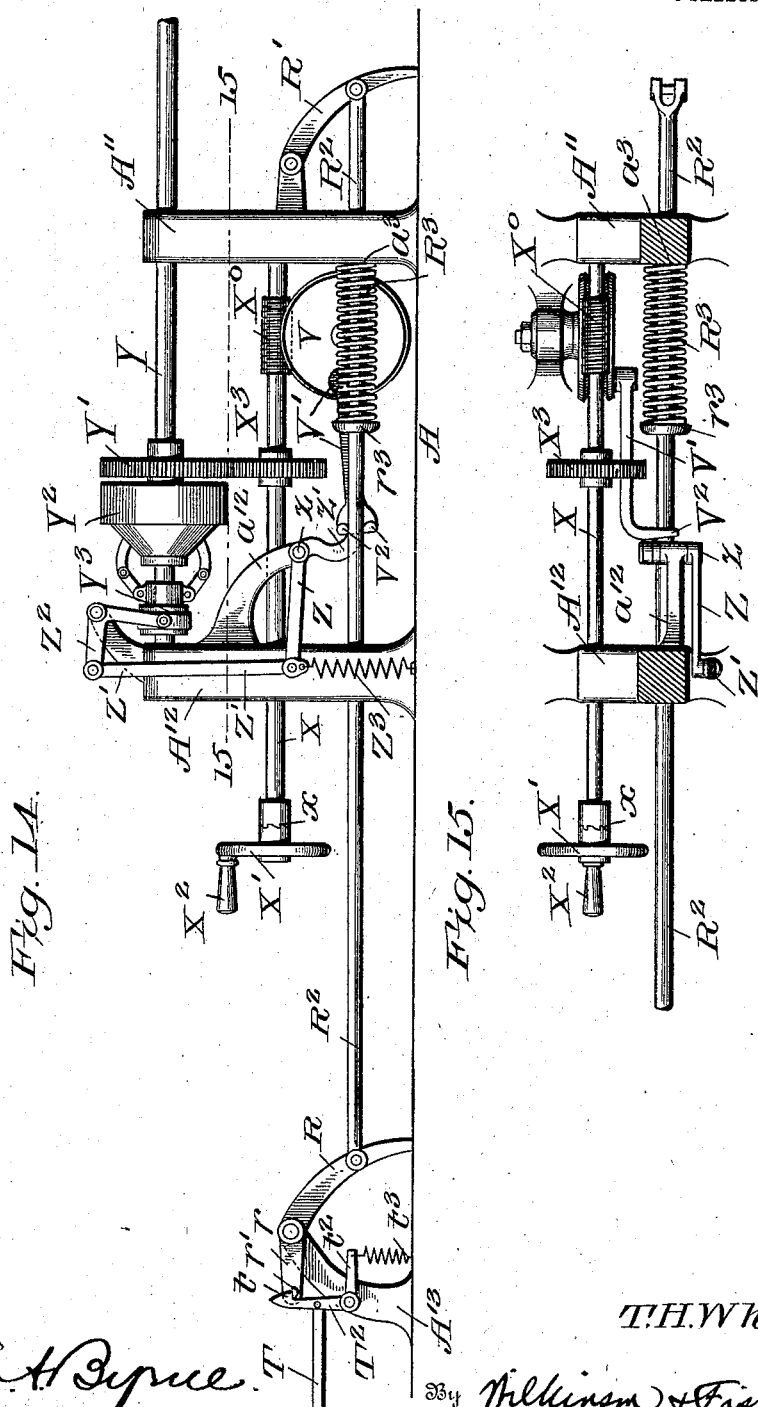

No. 815,393. PATENTED MAR. 20, 1906.
T. H. WHELESS.
TORPEDO CONVEYING AND LAUNCHING APPARATUS.
APPLICATION FILED OCT. 8, 1903.
8 SHEETS—SHEET 8.
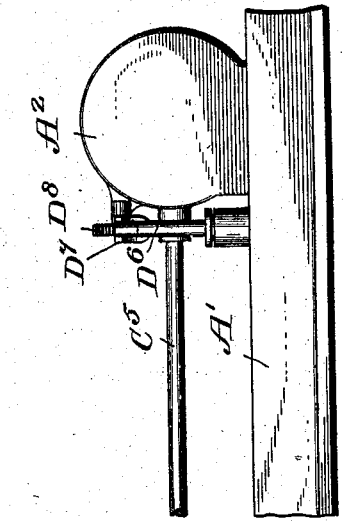
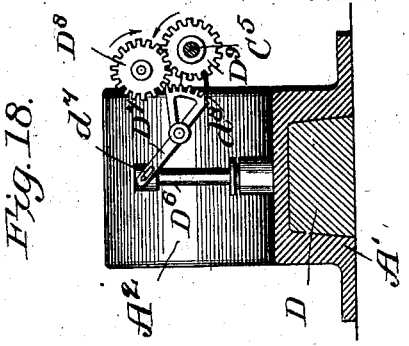
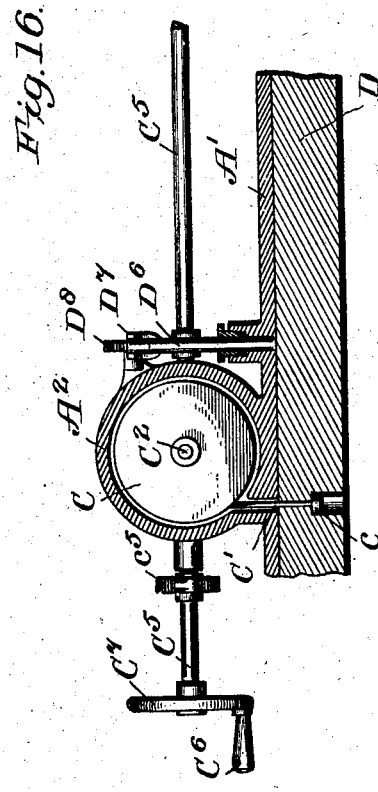
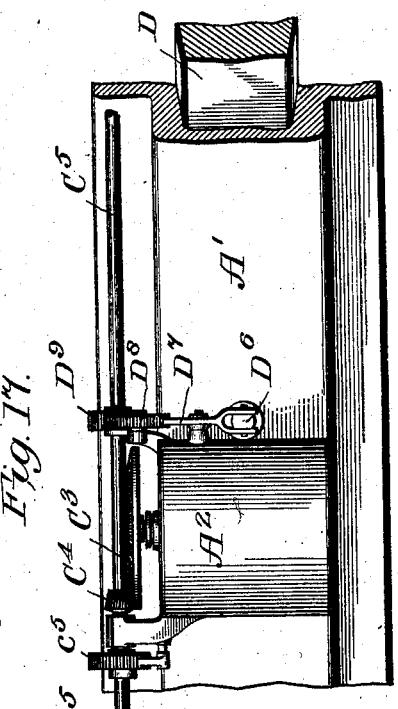
Inventor
T. H. Wheless.
Witnesses
By Wilkinson & Fisher,
Attorneys

UNITED STATES PATENT OFFICE.

THOMAS HENRY WHELESS, OF NEW YORK, N. Y.

TORPEDO CONVEYING AND LAUNCHING APPARATUS.

No. 815,393.　　　　Specification of Letters Patent.　　　Patented March 20, 1906.

Application filed October 8, 1903. Serial No. 176,291.

*To all whom it may concern:*

Be it known that I, THOMAS HENRY WHELESS, a citizen of the United States, residing at New York, in the borough of Manhattan and State of New York, have invented certain new and useful Improvements in Torpedo Conveying and Launching Apparatus; and I do hereby declare the following to be a full, clear, and exact description of the invention, such as will enable others skilled in the art to which it appertains to make and use the same.

My invention relates to improvements in apparatus for conveying and launching torpedoes from submarine or other vessels; and it is intended, primarily, to provide means whereby one or more torpedoes may be carried attached to the exterior of the hull of a submarine boat, ordinary torpedo-boat, torpedo-boat destroyer, or other vessel suitably equipped for the purpose and for launching said torpedo at the desired moment.

While I have shown in the drawings a single torpedo attached to the bottom of a submarine boat, I intend to cover the idea of attaching a plurality of torpedoes to the exterior of the hull of any suitable vessel, the said torpedo to be held below the water-line of the conveying vessel, and thus kept always water-borne and ready for launching.

My invention also consists in certain means for securing the torpedo to the hull of the vessel referred to, in certain means for releasing the torpedo when desired, and certain means for protecting the bow of the torpedo from becoming fouled with seaweed or other obstructions.

My invention also relates to certain improved means for charging the torpedo while immersed with its motive power, which is compressed air or other gas, or with withdrawing said compressed air or gas off from the torpedo, if desired.

My invention also relates to means whereby the motive power of the torpedo may be added to that of the vessel carrying same in case of emergency.

My invention will be understood by reference to the accompanying drawings, in which the same parts are indicated by the same letters throughout the several views.

Figure 1 shows diagrammatically a submarine boat having a torpedo suspended beneath the same and ready for launching. Fig. 2 shows diagrammatically the submarine boat with the torpedo just launched therefrom. Fig. 3 is a central vertical section through the hull of the carrying-boat and shows the apparatus by means of which the torpedo is secured to the boat, by means of which it is protected from fouling, by means of which the torpedo-engine is started and the torpedo is released and by means of which the torpedo is assisted out of its bearings by which it is secured to the boat. In Fig. 3 the parts are shown in the normal position in which the torpedo is firmly secured to the boat. Fig. 4 is a similar view to that shown in Fig. 3, except that the parts are shown in the first motion of starting the torpedo-engine prior to releasing the torpedo. Fig. 5 is a similar view to that shown in Figs. 3 and 4, except that the parts are in the final position after the torpedo has been completely released and started on its run. Fig. 6 is a plan view of the mechanism shown in Figs. 3, 4, and 5. Fig. 7 is a detail view, on a larger scale, showing the operative parts, as shown in Figs. 3 to 6, in the initial position, but before the torpedo has been attached to the boat. Fig. 8 is a plan view of the device shown in Fig. 7, parts being broken away. In the device shown in Figs. 3 to 8 the torpedo is attached to a beam, which is drawn up to a proper recess in the exterior of the hull of the boat by means of ropes and drums. Fig. 9 shows a modification in which the torpedo is attached directly to the hull of the boat. Fig. 10 shows another modification in which the guard-lever and the launching apparatus differ in certain details from that shown in Figs. 3 to 8. Fig. 11 shows a modification in which the torpedo-supporting arm is pivoted and drops down flush with the shell of the torpedo after the torpedo has been launched. Fig. 12 shows, on an enlarged scale, a modified form of apparatus generally similar to that shown in Fig. 10. Fig. 13 shows still another modification. Figs. 14 and 15 show mechanism operated by hand or by power for ejecting the torpedo from its bearings beneath the hull of the boat. Fig. 16 shows a sectional elevation of the apparatus for hoisting and for ejecting the beam to which the torpedo is attached. Fig. 17 is a plan view of one end of the device shown in Fig. 16, and Fig. 18 is an end view as seen from the right of Fig. 17.

Referring now to Figs. 1 and 2, A indicates diagrammatically a submarine boat; but any other vessel suitable for the purpose, whether intended to go beneath or float in the water, may be adopted, if desired. To this boat the torpedo B' is secured, as by means of the arms E'. The nose of the torpedo $b$ is protected by a suitable guard-arm K.

Referring now to Figs. 3 to 8, the torpedo B carries arms E, reduced, as at $e$, to pass into recesses $d^0$ in the large recess $D^0$ of the beam D, which beam is mounted in a recess in the housing A', which forms part of the outer shell of the boat. This beam may be of wood or of hollow metal or of other material having a less specific gravity than water, so that it will float when released from its bearings in the housing A'. In practice this beam is held in place by the wire ropes C', which have stops $c$ at the end thereof and pass over the drums C, which are mounted on shafts $C^2$, journaled in the casing $A^2$, which is preferably made integral with the housing A'. This shaft $C^2$ carries a bevel-gear $C^3$, meshing with the bevel-pinion $C^4$ on the shaft $C^5$, which shaft is turned by hand, as by means of the crank-pin $C^6$ and hand-wheel $C^7$, as shown most clearly in Figs. 7, 8, 16, and 17. It will be seen that both drums are turned by the revolution of the shaft $C^5$. In order to draw the torpedo in place beneath the carrying vessel, this beam D is ejected from its seat in the housing A', which may be done by means of one or more eccentrics or cams $D^3$, mounted in chambers $D^5$ and operated in any suitable way, as by the handles $D^4$, or these beams may be ejected from their seats in any other convenient way. One mode of ejecting the beam will be hereinafter described with reference to Figs. 16, 17, and 18. The same time that the beams are ejected the wire ropes C' are paid out, and the beam floats up to the surface of the water alongside of the vessel, so that it may be drawn up to the deck of a supply-boat or on a wharf or shore where the torpedo is attached. This is done by forcing the arms $e$ into the recess $d^0$ against the pressure of the spring-plungers F. When in the proper position, the latch H, which is mounted in the beam A and held in place and controlled by the spring $h$, will engage in the notch $e^2$ in one of the arms E, and thus will lock the torpedo to the beam. The torpedo is then eased overboard and is drawn with the beam to the proper position beneath the carrying-boat by winding up the drums C. The wire ropes C' will draw the beam to its proper position in the housing A'. When in this position, the opening $d^{00}$ in the beam will be beneath the starting-pin $M^3$, and the opening $d'$ in the beam will be beneath the supply-pipe W, by means of which the torpedo may be charged with compressed air or other gas, if desired; but it is preferably charged before being connected to the beam D. The torpedo being secured beneath the boat in the position indicated in Fig. 3 and the guard-arm K being in front of the nose of the torpedo, the operation of launching the torpedo will now be described. L represents a hand-lever, pivoted at L to a bracket fast to the boat, and M represents a connecting-rod, which is slotted, as at $M^0$, to engage a pin on the lever N, and is also connected at its further end to a bell-crank lever M', pivoted to the bracket $M^2$, fast to the boat carrying the slotted arms $m$, in which engages a pin, fast to the starting-pin $M^3$, which is normally pressed upward by the spring $m'$. The lever N is pivoted at $N^0$ and carries pins engaging in the slots $M^0$ and also in the slots $p^0$ of the connecting-rod P, which is connected to the T-lever Q, which is pivoted at $q$ and carries two arms $q'$ and $q^2$, the former carrying a releasing-pin $q^3$ and which is normally lifted by the spring $q^4$, connected to the arm $q^2$. This lever N is also connected by the connecting-rod N' to the short arm K', which is fast to the end of the shaft $k$, which projects beyond the walls of the recess $A^4$. This shaft carries the guard-arm K, which normally projects down in front of the nose of the torpedo, as shown in Figs. 1, 3, and 4, but which swings up into said recess $A^4$ when the torpedo is released, as shown in Fig. 5. Assuming the parts to be in the position shown in Fig. 3, the motion of the lever L rearward to the position shown in Fig. 4 will push the starting-pin $M^3$ down, causing it to open the starting-valve of the engine (not shown) and also to release the mechanism for spinning up the "Obry" gear. This being done, the quick motion of the lever to the forward position, as shown in Fig. 5, will lift the starting-pin, but will at the same time swing the guard-arm K up into its recess, will lift the latch H out of engagement with the notch $e^2$, and will allow the spring-plungers F to push the arm $e$ forward at the same time. The propeller or propellers now being in rapid revolution will cause the torpedo to leave its bearings in the beam D and to proceed on its run, as indicated in Fig. 5. After the torpedo is launched the parts remain in the position indicated in Fig. 5 until the beam is released and is drawn back again with the torpedo attached. In Fig. 7 the parts are shown in the initial position indicated in Fig. 3, except that the torpedo being omitted the spring-plunger is shown in its extended position, this for the sake of clearness of the drawings.

Referring now to the structure shown in Fig. 9, the details are generally similar to those already described with relation to Figs. 3 to 8, except that the torpedo is attached directly to the bottom of the boat, which is provided with a housing-plate $A^6$, having recesses $a^6$ for the arms $e$. Moreover, the lever Q' has a latch $q^3$, connected to the arms $q^2$, and which latch is normally held in engagement by the spring $q^4$. The arm $q'$ of this lever Q' is secured to the connecting-rod N', which is pivoted to the short arm K' on the shaft $k$, by means of which the guard-arm $K^2$ is swung down before the nose of the torpedo and also up into the recess $A^4$. This guard-arm $K^2$ is provided with fingers $k^2$ to engage the cocking-fan on the nose of the torpedo. This cocking-fan not being a part of my invention will not be further described herein.

In the form of device shown in Fig. 10 the spring-plungers F are dispensed with, their function being accomplished by other mechanism, which will be hereinafter described. Moreover, there are two guard-arms $K^3$, carrying a segmental arm $K^4$, which swings up into a recess $A^5$ in the bottom of the boat. The arms $K^3$ swing up into the recess $A^4$. The only essential difference between the launching mechanism shown in this figure and that already described with reference to Figs. 3 to 8 will now be explained. R and R' are two pusher-arms, which are pivoted to brackets $A^7$ and $A^8$. These arms are connected by the bar $R^2$, carrying the coil-spring $R^3$, which abuts at one end against a collar $r^3$ on said bar, at the other end on a lug $a^3$, fast to the boat. This bar carries the stud or projection $r^2$, which is struck by the lever S, pivoted to the boat, as at $s$, and carrying a pedal S'. It will be seen that if this pedal be pushed to the right (indicated by the arrow in Fig. 10) the lever S will engage the stud $r^2$ and will compress the spring $R^3$, drawing the pusher-bolts U and U' rearward to hold the spring in the compressed condition. The lever R has an arm $r$, carrying a stop $r'$, which engages the catch $t$ on the lever T, which lever T is connected to the lever $Q^2$ by a connecting-link T', which is slotted, as at $t^0$, to engage a pin on the lever $Q^2$. Thus it will be seen that when the parts are in the position shown in Fig. 10 the spring $R^3$ may be compressed by the lever S and that the catch $t$ will hold this spring in the compressed position. Now to launch the torpedo pull back the lever L, which will push down the starting-pin $M^3$, starting the engine of the torpedo and also spinning up the gyroscope for steering the torpedo. Now if the lever be pushed forward promptly forward of the initial position, as indicated in Fig. 5, the lever $Q^2$ will release the spring-latch H. The lever N will swing up the guard-arms $K^3$. The catch $t$ will be released, allowing the spring $R^3$ to push the levers R and R', and will cause the pusher-bolts U and U' to eject the torpedo from its bearings in the beam D'. This action will of course be supplemented by the forward thrust of the propeller or propellers.

In the device shown in Fig. 11 the attaching-arms $E^2$, by means of which the torpedo is attached to the beam or to the boat, are shown as pivoted to the torpedo, as at $e^3$, and as the torpedo starts on its run these arms drop down into a socket $B^0$ in the shell of the torpedo, and thus do not impede the torpedo in its course. In this device the releasing is accomplished without use of a spring, and the propeller alone is depended upon to start the torpedo forward.

It will be noted that the various recesses in the beam or in the bottom of the boat in which the attaching-arms of the torpedo are engaged are so shaped forwardly that the forward motion of the torpedo, as in launching, will cause the attaching-arms to readily clear themselves from their housings, and they will also serve as guides whereby the torpedo is started in the proper direction—in other words, in a fixed direction relative to the course of the vessel from which the torpedo is launched.

In the device shown in Fig. 12 the details are generally similar to those shown in Fig. 10, except that the latch $q^3$ is operated by the bell-crank lever $Q^2$ and is kept normally in engagement by means of the spring $q^4$. Moreover, the guard-arm K is similar to that already described with reference to Figs. 3 to 8.

Fig. 13 relates to improved apparatus operated by foot or hand power for releasing and ejecting the torpedo and does not relate to mechanism for starting the engine of the torpedo or for setting its gyroscope into operation, these effects being accomplished by any suitable mechanism—such, for instance, as that which has hereinbefore been described. In the apparatus shown in Fig. 13 for releasing and ejecting the torpedo the lever L' carries a treadle $L^3$ and is provided with a pusher-arm $L^4$, which engages the pusher-bar $U^2$, mounted in the recess $a^6$ and engaging the attaching-arm $e'$ of the torpedo B'. The latch $q^3$ is released by the bell-crank lever $Q^3$ and is normally held in engagement with the notch $e^2$ by means of the spring $q^4$. The lever L' is connected to the bell-crank lever $Q^3$ by means of the rod P, and the latter is connected to the short arm K', fast to the shaft $k$, by means of the connecting-rod $N^2$. Thus by pushing the lever L' forward, as by means of the treadle $L^3$, the latch is lifted, the guard-arm is raised, and the pusher-arm $L^4$ pushes the torpedo out of its bearings beneath the boat, thus allowing the torpedo to begin its run. The driving-engine of the torpedo and its steering-gear must of course have previously been put into operation by other mechanism. (Not shown in this figure.)

By having the attaching-arms $e'$ fit in inclined sockets, as shown in Figs. 10, 11, 12, and 13, the wedging effect of an inclined plane will be secured in ejecting the torpedo, and thus it will require comparatively little power to force the torpedo clear of its bearings at the bottom of the boat. A similar effect is secured by the forward inclined faces of the recesses (shown in Figs. 3, 4, 5, 7, and 9) from which the attaching-arms are ejected when the torpedo is launched.

Where power mechanism is obtainable or where it is desired to put a heavy compression on the spring $R^3$, (shown in Fig. 10,) suitable mechanical appliances may be used for compressing this spring—such, for instance, as is shown in Figs. 14 and 15, in which the lever R carries on its arm $r$ the stop $r'$, which engages the catch $t$ on the bell-crank lever $T^2$, which has an arm $t^2$ normally pressed down by the spring $t^3$, thus holding the catch $t$ normally in engagement. This catch is released by the connecting-rod T, as stated with reference to Fig. 10. $A^{11}$, $A^{12}$, and $A^{13}$ are brackets or bearings carried by the boat. The rod $R^2$ connects the pusher-levers R and $R'$ in the same way as shown in Fig. 10 and the spring $R^3$ may be compressed either by hand or by power gearing, as will now be described. V represents a worm-wheel mounted on suitable bearings and carrying a crank-pin, to which is pivoted the rod $V'$, having the forked arm $V^2$. Into this worm-wheel gears the worm $X^0$, fast on the shaft X, and the said shaft may be turned by means of the hand-wheel $X'$ and the handle $X^2$. $x$ indicates a suitable clutch for throwing said handle into and out of engagement when desired. Thus by turning this hand-wheel the worm-wheel V may be caused to revolve, causing the forked arm $V^2$ to drag the collar $r^3$, and with it the rod $R^2$, against the action of the spring $R^3$, and thus compressing said spring. The spring is held in the compressed position as before as by means of the catch $t$. In order to use power-gearing also, if desired, I provide a shaft Y, driven by any suitable source of power, which shaft carries a gear-wheel $Y'$, meshing with the gear-wheel $X^3$ on the shaft X. This gear-wheel $Y'$ is normally loose on the shaft Y, which shaft is constantly revolving, but is thrown into engagement by any suitable coupling—as, for instance, the coupling having the members $Y^2$ and $Y^3$, which are operated by the bell-crank lever Z. This crank is connected by the rod $Z'$ to the bell-crank lever Z, pivoted at $z$ to the bracket $a^{12}$ and has its lower arm $z'$ abut against the face of the rod $V'$. If now the shaft X be turned by hand through a short distance, the spring $R^3$ will be slightly compressed, which will not require any great power. At the same time the forked arm $V^2$ will be moved away from engagement with the bell-crank lever Z, which will allow the spring $Z^3$ to rock the bell-crank lever $Z^2$, thus throwing the clutch members $Y^2$ and $Y^3$ into engagement and applying the power-gearing to the rotation of the worm $X^0$. This will compress the spring $R^3$ with sufficient force to give a vigorous effect when the spring is released, as in launching the torpedo. After the compression of the spring has been accomplished the forked arm $V^2$ returns to its initial position, and by pulling the bell-crank $Z'$ to the left the clutch members $Y^2$ and $Y^3$ are disengaged, thus stopping further motion of the worm-gear. It will be obvious that various other means for compressing the spring $R^3$ may be adopted, if desired, and also various other means for positively ejecting the torpedo may be adopted. It will be evident that numerous modifications might also be made in the construction and operation of the guard-arms.

It will be evident that a single spring-plunger F may be used instead of two, if desired. It will be seen that the torpedo may be supplied with compressed air or gas through the pipe W, connection being made with the air-flask of the torpedo by the coupling $W'$ and screw-threads $w'$, passing through the hole $d'$ in the beam D and engaging the valve-seat of the air-flask, (not shown,) and that the air may be withdrawn from the air-flask of the torpedo by the same pipe W. Furthermore, the torpedo-engine may be started without detaching the torpedo from the boat, and thus the torpedo may be used to propel or to help propel the boat for a short time, as shown in Fig. 4. This might be important under special circumstances, as in night attacks, should the ordinary motive power of the boat prove inadequate or fail altogether.

The beam D may be ejected, as by means of the cam-levers $D^4$ and cams $D^3$, (shown in Figs. 3 to 8,) or in any other convenient way, as already stated; but I prefer to have the mechanism for unwinding the drums, thus paying out the ropes $C'$, automatically operate the device for detaching the beam D from its housing in the hull of the boat, so that it may float to the surface, as before described. Suitable mechanism for this purpose is shown in Figs. 16 to 18, in which the shaft $C^5$ for operating the drums carries a gear-wheel $D^9$, meshing in the gear-wheel $D^8$, which meshes in the segmental racks $d^8$ on the lever $D^7$, the opposite arm of which lever is slotted, as at $d^7$, and is forked to engage the head of the pin $D^6$. There are preferably two of these pins $D^6$, which pass through stuffing-boxes in the hull of the boat, as shown in Fig. 16. The operation of the device will be as follows: Supposing the parts to be in the position indicated in Figs. 16 and 18 with the pins $D^6$ raised, the motion of the hand-wheel $C^7$ to unwind the drums will cause the gears $D^8$ and $D^9$ to move in the direction of the arrows in Fig. 18 and will swing the segmental rack $d^8$ up, pushing down the pin $D^6$. The rack will pass out of engagement with the gear $D^8$ when the pin $D^6$ has been moved down the requisite distance, thus dislodging the beam D from its bearings. After this has been done the shaft $C^5$ may be turned indefinitely when winding the ropes $C'$ without further action on the pins $D^6$. When it is desired to haul in the beam D, the hand-wheel $C^7$ is rotated in the reverse direction, causing the gears $D^9 D^8$ to revolve in a direction opposite to that indicated by the arrows in Fig. 18, and thus restoring the parts to the initial position indicated in Fig. 18. It will be obvious that the same result may be accomplished in a great many other ways.

It will be obvious that various other modifications than those hereinbefore described might be made which could be used without departing from the spirit of my invention.

Having thus described my invention, what I claim, and desire to secure by Letters Patent of the United States, is—

1. The combination with a boat or other vessel, of an automobile torpedo detachably connected to the exterior of the hull thereof beneath the water, means for turning on the motive power of said torpedo and for releasing same from said hull, with a coil-spring under compression for ejecting the torpedo from its bearings when released, substantially as described.

2. The combination with a boat or other vesssel, of an automobile torpedo detachably connected to the exterior of the hull thereof beneath the water, and hand-operated mechanism for turning on the motive power of said torpedo and for releasing said torpedo from said hull, with a coil-spring under compression for ejecting the torpedo from its bearings when released, substantially as described.

3. The combination with a boat or other vessel, of an automobile torpedo detachably connected to the exterior of the hull thereof beneath the water, means for turning on the motive power of said torpedo and for releasing the torpedo from said hull, a spring under compression, and means operated thereby for ejecting the torpedo from its bearings when released, substantially as described.

4. The combination with a boat or other vessel, of an automobile torpedo detachably connected to the exterior of the hull thereof beneath the water, and hand-operated mechanism for turning on the motive power of said torpedo and for releasing said torpedo from said hull, a spring under compression, and means operated thereby for ejecting the torpedo from its bearings when released, substantially as described.

5. The combination with a boat or other vessel, of an automobile torpedo detachably connected to the exterior of the hull thereof beneath the water, with a guard-arm protecting the nose of the torpedo, means for turning on the motive power of said torpedo, for raising said guard-arm, and for releasing the torpedo from said hull, with a coil-spring under compression for ejecting the torpedo from its bearings when released, substantially as described.

6. The combination with a boat or other vessel, of an automobile torpedo detachably connected to the exterior of the hull thereof beneath the water, with a guard-arm protecting the nose of the torpedo, hand-operated mechanism for turning on the motive power of said torpedo, for raising said guard-arm, and for releasing said torpedo from said hull, with a coil-spring under compression for ejecting the torpedo from its bearings when raised, substantially as described.

7. The combination with a boat or other vessel, of an automobile torpedo detachably connected to the exterior of the hull thereof beneath the water, with a guard-arm protecting the nose of the torpedo, means for turning on the motive power of said torpedo, for raising said guard-arm, and for releasing same from said hull, a spring under compression, and means operated thereby for ejecting the torpedo from its bearings when released, substantially as described.

8. The combination with a boat or other vessel, of an automobile torpedo detachably connected to the exterior of the hull thereof beneath the water, with a guard-arm protecting the nose of the torpedo, and hand-operated mechanism for turning on the motive power of said torpedo, for raising said guard-arm, and for releasing said torpedo from said hull, a spring under compression, and means operated thereby for ejecting the torpedo from its bearings when released, substantially as described.

9. The combination with a boat or other vessel, of an automobile torpedo detachably connected to the exterior of the hull thereof beneath the water, a starting-pin for starting the motive power of said torpedo, a latch for holding said torpedo in place beneath said hull, and means for first moving said starting-pin and then withdrawing said latch, with means for ejecting the torpedo from its engagement with said hull when released, substantially as described.

10. The combination with a boat or other vessel, of an automobile torpedo detachably connected to the exterior of the hull thereof beneath the water, a starting-pin for starting the motive power of said torpedo, a latch for holding said torpedo in place beneath said hull, and means for first moving said starting-pin and then withdrawing said latch, with a spring under compression, with means operated thereby for ejecting the torpedo from its engagement with said hull when released, substantially as described.

11. The combination with a boat or other vessel, of an automobile torpedo detachably connected to the exterior of the hull thereof beneath the water, a series of levers operated by hand, with mechanism operated thereby for starting the motive power of said torpedo and for releasing the torpedo from said hull, with a spring under compression for ejecting the torpedo from its bearings when released, substantially as described.

12. The combination with a boat or other vessel, of an automobile torpedo detachably connected to the exterior of the hull thereof beneath the water, a series of levers with mechanism operated thereby, for turning on the motive power of said torpedo and for releasing said torpedo from said hull, a coil-spring under compression, and means operated thereby, for ejecting the torpedo from its bearings when released, substantially as described.

13. The combination with a boat or other vessel, of an automobile torpedo provided with attaching-arms detachably connected to the exterior of the hull of the boat beneath the water, a latch engaging one of said arms, means for starting the motive power of said torpedo, and means for releasing said latch, substantially as described.

14. The combination with a boat or other vessel, of an automobile torpedo provided with attaching-arms detachably connected to the exterior of the hull of the boat beneath the water, a latch engaging one of said arms, means for starting the motive power of said torpedo, means for releasing said latch, a spring under compression, and means operated thereby for ejecting the torpedo from its bearings when released, substantially as described.

15. In an apparatus for conveying and launching torpedoes, the combination with a vessel provided with a recess in its hull beneath the water, of a beam adapted to float in water, an automobile torpedo, means for attaching said automobile torpedo to said beam, means for drawing said beam with said torpedo attached to its recess in the hull of the vessel, and means for turning on the motive power of said torpedo and releasing same from said beam, substantially as described.

16. In an apparatus for conveying and launching torpedoes, the combination with a vessel provided with a recess in its hull beneath the water, of a beam adapted to float in water, an automobile torpedo, means for attaching said automobile torpedo to said beam, means for drawing said beam with said torpedo attached to its recess in the hull of the vessel, and means for turning on the motive power of said torpedo and releasing same from said beam, with means for ejecting said torpedo from engagement with said beam, substantially as described.

17. In an apparatus for conveying and launching torpedoes, the combination with a vessel provided with a recess in its hull beneath the water, of a beam adapted to float in water, an automobile torpedo, means for attaching said automobile torpedo to said beam, means for drawing said beam with said torpedo attached to its recess in the hull of the vessel, means for turning on the motive power of said torpedo and releasing same from said beam, a spring under compression, and means operated thereby for ejecting said torpedo from engagement with said beam, substantially as described.

18. In an apparatus for conveying and launching torpedoes, the combination with a vessel provided with a recess in its hull beneath the water, of a beam adapted to float in water provided with recesses therein, an automobile torpedo, means for attaching said automobile torpedo to said beam, drums and ropes for drawing said beam with said torpedo attached to its recess in the hull of the vessel, and means for turning on the motive power of said torpedo and releasing same from said beam, substantially as described.

19. In an apparatus for conveying and launching torpedoes, the combination with a vessel provided with a recess in its hull beneath the water, of a beam adapted to float in water, an automobile torpedo, means for attaching said automobile torpedo to said beam, means for drawing said beam with said torpedo attached to its recess in the hull of the vessel, means for ejecting said beam from said recess when desired, and means for turning on the motive power of said torpedo and releasing same from said beam, substantially as described.

20. In an apparatus for conveying and launching torpedoes, the combination with a vessel provided with a recess in its hull beneath the water, of a beam adapted to float in water, an automobile torpedo, means for attaching said automobile torpedo to said beam, drums and ropes operated from within said vessel for drawing said beam with said torpedo attached to its recess in the hull of the vessel, means for ejecting said beam from said recess when desired, and means for turning on the motive power of said torpedo and releasing same from said beam, substantially as described.

21. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam for drawing said beam with said torpedo attached to its recess in the hull of the vessel, and means for turning on the motive power of said torpedoes and releasing same from said beam, with means for ejecting said torpedo from engagement with said beam, substantially as described.

22. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means for ejecting said beam from said recess when desired, and means for turning on the motive power of said torpedo and releasing same from said beam, with means for ejecting said torpedo from engagement with said beam, substantially as described.

23. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means for turning on the motive power of said torpedo and releasing same from said beam, with means for ejecting said torpedo from engagement with said beam, a spring under compression, and means operated thereby for ejecting said torpedo from engagement with said beam, substantially as described.

24. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means for ejecting said beam from said recess when desired, means for turning on the motive power of said torpedo and releasing same from said beam, a spring under compression, and means operated thereby for ejecting said torpedo from engagement with said beam, substantially as described.

25. In an apparatus for conveying and launching torpedoes, the combination with a vessel provided with a recess in its hull beneath the water, of a beam adapted to float in water provided with recesses therein, an automobile torpedo, provided with attaching-arms adapted to engage in said recesses, means for drawing said beam with said torpedo attached to its recess in the hull of the vessel, and means for turning on the motive power of said torpedo and releasing same from said beam, substantially as described.

26. In an apparatus for conveying and launching torpedoes, the combination with a vessel provided with a recess in its hull beneath the water, of a beam adapted to float in water provided with recesses therein, an automobile torpedo, provided with attaching-arms adapted to engage in said recesses, means for drawing said beam with said torpedo attached to its recess in the hull of the vessel, and means for turning on the motive power of said torpedo and releasing same from said beam, with means for ejecting said torpedo from engagement with said beam, substantially as described.

27. In an apparatus for conveying and launching torpedoes, the combination with a vessel provided with a recess in its hull beneath the water, of a beam adapted to float in water provided with recesses therein, an automobile torpedo, provided with attaching-arms pivoted thereto and adapted to engage in said recesses, means for drawing said beam with said torpedo attached to its recess in the hull of the vessel, and means for turning on the motive power of said torpedo and releasing same from said beam, substantially as described.

28. In an apparatus for conveying and launching torpedoes, the combination with a vessel provided with a recess in its hull beneath the water, of a beam adapted to float in water provided with recesses therein, an automobile torpedo, provided with attaching-arms pivoted thereto and adapted to engage in said recesses, means for drawing said beam with said torpedo attached to its recess in the hull of the vessel, and means for turning on the motive power of said torpedo and releasing same from said beam, with means for ejecting said torpedo from engagement with said beam, substantially as described.

29. In an apparatus for conveying and launching torpedoes, the combination with a vessel provided with a recess in its hull beneath the water, of a beam adapted to float in water, provided with recesses therein, an automobile torpedo, provided with attaching-arms adapted to engage in said recesses, means for drawing said beam with said torpedo attached to its recess in the hull of the vessel, means for turning on the motive power of said torpedo and releasing same from said beam, a spring under compression, and means operated thereby for ejecting said torpedo from engagement with said beam, substantially as described.

30. In an apparatus for conveying and launching torpedoes, the combination with a vessel provided with a recess in its hull beneath the water, of a beam adapted to float in water, an automobile torpedo, projecting arms and a latch for attaching said automobile torpedo to said beam, means for drawing said beam with said torpedo attached to its recess in the hull of the vessel, and means operated from within said vessel for turning on the motive power of said torpedo, with means for releasing said latch and ejecting the torpedo from said beam, substantially as described.

31. In an apparatus for conveying and launching torpedoes, the combination with a vessel provided with a recess in its hull beneath the water, of a beam adapted to float in water, an automobile torpedo, projecting arms and a latch for attaching said automobile torpedo to said beam, means for drawing said beam with said torpedo attached to its recess in the hull of the vessel, means for ejecting said beam from its recess in the hull, when desired, and means operated from within said vessel for turning on the motive power of said torpedo, with means for releasing said latch and ejecting the torpedo from said beam, substantially as described.

32. In an apparatus for conveying and launching torpedoes, the combination with a vessel provided with a recess in its hull beneath the water, of a beam adapted to float in water, an automobile torpedo, projecting arms and a latch for attaching said automobile torpedo to said beam, drums mounted in the vessel, with ropes wound on said drums and connected to said beam for drawing said beam with said torpedo attached to its recess in the hull of the vessel, and means operated from within said vessel for turning on the motive power of said torpedo, with means for releasing said latch and ejecting the torpedo from said beam, substantially as described.

33. In an apparatus for conveying and launching torpedoes, the combination with a vessel provided with a recess in its hull beneath the water, of a beam adapted to float in water, an automobile torpedo, projecting arms and a latch for attaching said automobile torpedo to said beam, drums mounted in the vessel, with ropes wound on said drums and connected to said beam for drawing said beam with said torpedo attached to its recess in the hull of the vessel, means for ejecting said beam from its recess in the hull, when desired, and means operated from within said vessel for turning on the motive power of said torpedo, with means for releasing said latch and ejecting the torpedo from said beam, substantially as described.

34. The combination with a boat or other vessel, of an automobile torpedo provided with attaching-arms pivoted thereto, said arms being detachably connected to the exterior of the hull of the boat beneath the water, a latch engaging one of said arms, means for starting the motive power of said torpedo, and means for releasing said latch, substantially as described.

35. The combination with a boat or other vessel, of an automobile torpedo provided with attaching-arms pivoted thereto, said arms being detachably connected to the exterior of the hull of the boat beneath the water, a latch engaging one of said arms, means for starting the motive power of said torpedo, means for releasing said latch, a spring under compression, and means operated thereby for ejecting the torpedo from its bearings when released, substantially as described.

36. The combination with a boat or other vessel, of an automobile torpedo detachably connected to the exterior of the hull thereof beneath the water, a hand-lever and mechanism operated thereby for turning on the motive power of said torpedo and for releasing said torpedo from said hull, with independent spring-operated mechanism for ejecting the torpedo from its bearings when released, substantially as described.

37. The combination with a boat or other vessel, of an automobile torpedo, means for detachably connecting said torpedo to the exterior of the hull of said boat or vessel beneath the water-line, a hand-lever mounted within the boat or vessel, and mechanism operated thereby for first turning on the motive power to said torpedo, and then releasing the torpedo, with independent means for ejecting said torpedo from its engagement with said hull when released, substantially as described.

38. The combination with a boat or other vessel, of an automobile torpedo detachably connected to the exterior of the hull thereof beneath the water, a guard-arm pivoted to said boat or vessel and normally projecting in front of the nose of said torpedo, a hand-lever and mechanism operated thereby for turning on the motive power of said torpedo and for releasing said torpedo from said hull, and also for raising said guard-arm, with independent spring-operated mechanism for ejecting the torpedo from its bearings when released, substantially as described.

39. The combination with a boat or other vessel, of an automobile torpedo, means for detachably connecting said torpedo to the exterior of the hull of said boat or vessel beneath the water-line, a guard-arm pivoted to said boat or vessel and normally projecting in front of the nose of said torpedo, a hand-lever mounted within the boat or vessel, and mechanism operated thereby for first turning on the motive power to said torpedo, and then releasing the torpedo, and also for raising said guard-arm, with independent means for ejecting said torpedo from its engagement with said hull when released, substantially as described.

40. In an apparatus for conveying and launching torpedoes, the combination with a vessel provided with a recess in its hull beneath the water, a guard-arm pivoted to said hull in front of said recess, of a beam adapted to float in water provided with recesses therein, an automobile torpedo, means for attaching said automobile torpedo to said beam, means for drawing said beam with said torpedo attached to its recess in the hull of the vessel, and means for turning on the motive power of said torpedo and releasing same from said beam, and also raising said guard-arm, with means for ejecting said torpedo from engagement with said beam, substantially as described.

41. In an apparatus for conveying and launching torpedoes, the combination with a vessel provided with a recess in its hull beneath the water, a guard-arm pivoted to said hull in front of said recess, of a beam adapted to float in water, provided with recesses therein, an automobile torpedo, means for attaching said automobile torpedo to said beam, means for drawing said beam with said torpedo attached to its recess in the hull of the vessel, means for turning on the motive power of said torpedo and releasing same from said beam, and also raising said guard-arm, a spring under compression, and means operated thereby for ejecting said torpedo from engagement with said beam, substantially as described.

42. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam for drawing said beam with said torpedo attached to its recess in the hull of the vessel, means automatically operated by unwinding said ropes for ejecting said beam from its bearings, and means for turning on the motive power of said torpedoes and releasing same from said beam, substantially as described.

43. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam for drawing said beam with said torpedo attached to its recess in the hull of the vessel, cogged sectors, push-pins operated thereby, a shaft and gearing for rotating said drums, and gearing connecting said shaft to said sector for automatically operating said push-pins, and means for turning on the motive power of said torpedoes and releasing same from said beam, substantially as described.

44. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means automatically operated by unwinding said ropes for ejecting said beam from its bearings, and means for turning on the motive power of said torpedo and releasing same from said beam, with means for ejecting said torpedo from engagement with said beam, substantially as described.

45. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, cogged sectors, push-pins operated thereby, a shaft and gearing for rotating said drums, and gearing connecting said shaft to said sector for automatically operating said push-pins, and means for turning on the motive power of said torpedo and releasing same from said beam, with means for ejecting said torpedo from engagement with said beam, substantially as described.

46. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means automatically operated by unwinding said ropes for ejecting said beam from its bearings, means for turning on the motive power of said torpedo and releasing same from said beam, with means for ejecting said torpedo from engagement with said beam, a spring under compression, and means operated thereby for ejecting said torpedo from engagement with said beam, substantially as described.

47. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, cogged sectors, push-pins operated thereby, a shaft and gearing for rotating said drums, and gearing connecting said shaft to said sector for automatically operating said push-pins, means for turning on the motive power of said torpedo and releasing same from said beam, with means for ejecting said torpedo from engagement with said beam, a spring under compression, and means operated thereby for ejecting said torpedo from engagement with said beam, substantially as described.

48. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, means automatically operated by unwinding said ropes for ejecting said beam from its bearings, means for ejecting said beam from said recesses when desired, means for turning on the motive power of said torpedo and releasing same from said beam, with means for ejecting said torpedo from engagement with said beam, a spring under compression, and means operated thereby for ejecting said torpedo from engagement with said beam, substantially as described.

49. In an apparatus for conveying and launching torpedoes, the combination with a vessel provided with a recess in its hull beneath the water, of a beam adapted to float in water, an automobile torpedo, means for attaching said automobile torpedo to said beam, drums mounted in said vessel, ropes wound on said drums and connected to said beam, for drawing said beam with said torpedo attached to its recess in the hull of the vessel, cogged sectors, push-pins operated thereby, a shaft and gearing for rotating said drums, and gearing connecting said shaft to said sector for automatically operating said push-pins, means for ejecting said beam from said recesses when desired, means for turning on the motive power of said torpedo and releasing same from said beam, with means for ejecting said torpedo from engagement with said beam, a spring under compression, and means operated thereby for ejecting said torpedo from engagement with said beam, substantially as described.

In testimony whereof I affix my signature in presence of two witnesses.

THOMAS HENRY WHELESS.

Witnesses:
E. M. BRANDT,
J. STEPHEN GUISTA.